3,136,755
INSOLUBLE POLYMERIC-IODINE COMPLEXES
Frederick Grosser, Midland Park, and John Susko, Clark, N.J., assignors to General Aniline & Film Corporation, New York, N.Y., a corporation of Delaware
No Drawing. Filed Dec. 1, 1960, Ser. No. 72,862
9 Claims. (Cl. 260—239.3)

The present invention relates to iodine complexes of insoluble polymeric N-vinyl materials having various industrial and pharmaceutical applications.

The preparation of water-soluble and organic-solvent soluble polymeric materials from N-vinyl-2-pyrrolidones is well known in the art. Normally such polymeric materials are obtained by the polymerization of N-vinyl-2-pyrrolidones, either in bulk or in solution while employing peroxides alone, peroxides with ammonium hydroxide as an activator, ultraviolet light, and azo compounds as catalysts. Regardless of the procedure utilized in the polymerization reaction or the type of catalyst employed, polymeric materials are obtained which are quite soluble in water and in many of the commonly known organic solvents such as aliphatic alcohols, ketones, chlorinated hydrocarbons, lactones, and the like.

It is also known that the combination of polyvinylpyrrolidone, prepared in accordance with the prior art procedures, with iodine has resulted in the formation of a stable, water-soluble product. In the Herman A. Shelanski Patent 2,739,922, there is taught the preparation of a novel water-soluble composition of polyvinylpyrrolidone with iodine and other halogens that has been found to be of substantial value for many industrial, clinical and pharmaceutical applications in which advantage is taken of the bactericidal activity of the iodine and by which in turn the irritating, sensitizing and toxic properties of the iodine are substantially overcome. As disclosed in this patent, the water-soluble iodine polyvinylpyrrolidone composition is prepared by adding a solution of iodine or a tincture of iodine to an aqueous solution of polyvinylpyrrolidone. Such composition may alos be prepared as disclosed in the Hans Beller et al. U.S. Patent 2,706,701 by thoroughly mixing dry elemental iodine with dry powdered polyvinylpyrrolidone. The iodine and powdered polymer are mixed until a homogeneous powder is obtained, the mixing being carried out by grinding the iodine and polyvinylpyrrolidone either in a mortar and pestle or in any conventional industrial mechanical mixer such as a ball mill, the interior of which is constructed of materials inert to elemental iodine.

Attempts, while utilizing the foregoing procedures, to obtain insoluble-polymeric iodine complexes which have distinct advantages over the soluble materials, as pointed out hereinafter, were fruitless. Regardless of the method of polymerization, i.e., bulk or solution, and regardless of the catalyst employed, a water-soluble polymeric material was always obtained which upon complexing with iodine yielded a water-soluble iodine complex.

To provide insoluble polymeric iodine complexes having many new and novel uses constitutes the principal object of the present invention.

Other objects and advantages will appear from the following description:

We have discovered that valuable compositions of insoluble polymers of 5-, 6- and 7-membered heterocyclic N-vinyl compounds containing iodine in stable and insoluble form are readily prepared by mixing elemental iodine with insoluble polymers of the various N-vinyl-2-pyrrolidones, N-vinyl-2-piperidones, N-vinyl-E-caprolactams, N-vinyl-2-oxazolidones and N-vinyl-3-morpholinones. All of these polymeric materials are insoluble in water, strong mineral acids such as hydrochloric, sulfuric, nitric acid, and the like, caustic solutions and organic solvents such as glacial acetic acid, methanol, ethanol, acetone, chloroform, ethyl acetate, xylene, pyridine, diethylether, petroleum ether, carbon tetrachloride, methylethyl ketone, petroleum hydrocarbons such as kerosene, dibutylphthalate, triethylene glycol, propargyl alcohol, nonylphenol, vinylisobutylether, dioxane, and the like.

The procedure utilized in preparing the insoluble polymers of N-vinyl-2-pyrrolidones, N-vinyl-2-piperidones, N-vinyl-ε-caprolactams, N-vinyl-2-oxazolidones, and N-vinyl-3-morpholinones is that disclosed in the U.S. Patent 2,938,017 of Frederick Grosser, issued May 4, 1960, the complete specification of which is incorporated by reference thereto. In general, these insoluble polymers are prepared by heating the N-vinylmonomer in the presence of a small amount from about 0.1% to 5% of alkali metal or alkaline earth metal or the oxides, hydroxides and alkoxides of these metals at a temperature of from about 40° to 200° C. The polymers thus formed are white to nearly-white powders which are insoluble in water and in the aforementioned caustic solutions, acids and common organic solvents.

As illustrative examples of N-vinyl-2-pyrrolidones, that are polymerized in accordance with the procedure of the aforementioned patent, the following may be mentioned:

N-vinyl-2-pyrrolidone
5-methyl-N-vinyl-2-pyrrolidone
5-ethyl-N-vinyl-2-pyrrolidone
3,3-dimethyl-N-vinyl-2-pyrrolidone
3-methyl-N-vinyl-2-pyrrolidone
3-ethyl-N-vinyl-2-pyrrolidone
4-methyl-N-vinyl-2-pyrrolidone
4-ethyl-N-vinyl-2-pyrrolidone
3-phenyl-3-β-diethylamine-ethyl-N-vinyl-2-pyrrolidone
5-hydroxymethyl-N-vinyl-2-pyrrolidone The N-vinyl-2-piperidone which is polymerized into an insoluble polymer is characterized by the following general formula

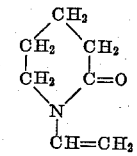

The N-vinyl-caprolactam which is polymerized into an insoluble polymer is characterized by the following general formula:

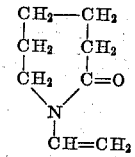

The N-vinyl-2-oxazolidone which is polymerized into an insoluble polymer is characterized by the following general formula:

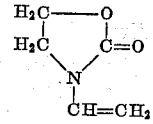

The preparation of N-vinyl-2-oxazolidone is accomplished by the dehydrochlorination of N(β-chloroethyl) oxazolidone with metallic potassium in tertiary butyl alcohol or by the reaction of sodium methylate with the 2-chloroethyl ester of 2-chloroethyl carbamic acid in tetrahydrofuran as solvent, as is more fully described in the Journal of Organic Chemistry, volume 22, pages 849 to 851, July 1957. In addition to N-vinyl-2-oxazolidone, we may also employ N-vinyl-5-methyl-2-oxazolidone and N-vinyl-5-ethyl-2-oxazolidone.

The N-vinyl-3-morpholinones employed in the preparation of the insoluble polymers are characterized by the following formulae:

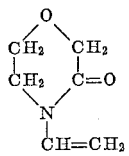

N-vinyl-3-morpholinone

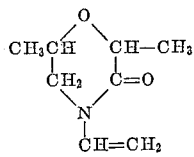

N-vinyl-2,6-dimethyl-3-morpholinone

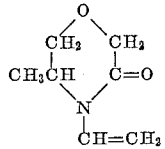

N-vinyl-5-methyl-3-morpholinone

The foregoing N-vinyl-3-morpholinones are readily obtained by first reacting methyl substituted or unsubstituted 3-morpholines with acetylene at elevated temperatures in the presence of a strongly basic agent. The methyl substituted and unsubstituted 3-morpholines reactive with acetylene are more fully described in the application of R. L. Mayhew and S. A. Glickman, Serial No. 781,440, filed on December 19, 1958, now abandoned, the entire specification of which is incorporated herein by reference thereto. The reaction of such methyl substituted and unsubstituted 3-morpholines with acetylene is carried out in any conventional pressure tight vessel in accordance with the procedure described in the pending application of S. A. Glickman, Serial No. 781,438, filed on December 19, 1958, now abandoned, the entire teachings of which are also incorporated herein by reference thereto.

The following examples will serve to illustrate the preparation of several insoluble polymers other than those of N-vinyl-2-pyrrolidone and the complexing thereof with elemental iodine. It is to be understood, however, that these examples are merely illustrative and are not to be considered as being limitative of the invention disclosed and claimed.

All parts are by weight unless otherwise noted.

*Example I*

200 grams of 5-methyl-N-vinyl-2-pyrrolidone and 2 grams of sodium hydroxide flakes were heated in a distilling flask at 100 mm. under total reflux for about 3 hours. During this time the temperature rose to about 190° C. and the refluxing monomer was converted to a white solid. After cooling, the polymer was slurried in water to wash out the caustic and residual monomer and then filtered and dried, at 50–60° C. in vacuo.

*Example II*

100 grams of N-vinyl-caprolactam and 4 grams of sodium methylate were heated in a distilling flask at 100 mm. under reflux for about ¾ of an hour. During this time the temperature rose to about 215° C. and the refluxing monomer converted to a white solid. After cooling, the polymer was washed several times with water, filtered and dried at 50–60° C. in vacuo.

*Example III*

50 grams of N-vinyl-2-oxazolidone and 2 grams of potassium hydroxide pellets were heated in a distilling flask at 100 mm. under reflux for about 12 hours. During this time the temperature rose from 190–240° C. and the refluxing monomer converted to a white solid. After cooling, the polymer was washed several times with water, filtered and dried at 50–60° C. in vacuo.

*Example IV*

75 grams of N-vinyl-5-methyl-2-oxazolidone and 3 grams of potassium hydroxide pellets were heated in a distilling flask at 100 mm. under reflux for about 6 hours. During this time the temperature rose from 180 to 225° C. and the refluxing monomer converted to a white solid. After cooling, the polymer was washed several times with water to remove excess alkali and the monomer then filtered and dried at 50–60° C. in vacuo.

*Example V*

100 grams of N-vinyl-3-morpholinone and 1 gram of sodium hydroxide flakes were heated in a distilling flask at 100 mm. under reflux for about 5 hours. During this time the temperature rose from 170 to 205° C. and the refluxing monomer converted to a white solid. After cooling, the polymer was slurried with water several times to wash out the caustic and unconverted monomer filtered and dried at 50–60° C. in vacuo.

Since the exact mechanism of the alkali polymerization of the foregoing N-vinyl-monomers is not clearly understood at the present time, very little is known of the chemical structure of the resulting polymers. Suffice it to say that since all of the polymers prepared in accordance with the foregoing examples are insoluble in water, caustic solutions, mineral acids and all known organic solvents, it is indicative that they differ in chemical and physical characteristics from those prepared by polymerizing the same monomers by conventional means, either in bulk or solution. In view of their general insolubility, it is reasonable to assume that the insoluble polymers may be cross-linked, three-dimensional polymers since chemical analysis indicate virtually no free remaining vinyl groups.

In preparing the insoluble polymeric iodine complexes of the present invention, 100 parts by weight of the vacuum dried insoluble polymer is tumbled with 1 to 50 parts by weight of elemental iodine in any conventional ceramic or glass lined ball mill for a period of 4 to 24 hours. Usually a period of 12–14 hours is sufficient for complexing. During this time, when a sample of the iodine complex is shaken in carbon tetrachloride, there is revealed the presence of minute amounts of elemental iodine by the lavender color of the carbon tetrachloride. After complexing has been accomplished, as indicated by substantially colorless carbon tetrachloride, the insoluble polymeric iodine material is heated at 50–100° C. for 12–24 hours. It appears that this treatment converts remaining traces of elemental iodine to additional iodine-complex. This has been verified by shaking a small part of the stabilized material in carbon tetrachloride. The latter remains completely colorless. This test also substantiates the totality of the detoxification of the iodine in the complex.

Depending on the parts by weight of element iodine, insoluble polymeric iodine complexes are obtained in which the available iodine ranges from 0.05 to 25%. The iodine complexed polymers are stable under normal temperatures and conditions of relative humidity and do not increase or decrease their available iodine content as is the case with the water-soluble iodine adducts of polyvinylpyrrolidone.

*Example VI*

100 grams of the insoluble polymer prepared from N-vinyl-2-pyrrolidone in accordance with Example I of the aforementioned Grosser patent and 15 grams of elemental iodine were tumbled in a conventional ceramic ball mill for a period of 18 hours. Thereafter the homogeneous mixture was heated for 24 hours at a temperature of 90° C.

In the analytical determination of available iodine of the resulting complex the normal thiosulfate procedure was used. Despite the insolubility of the iodine complex the aqueous titration proceeded normally and gave 8.8% available iodine.

*Example VII*

100 grams of the dried product of Example I above and 5 grams of elemental iodine were mixed at room temperature in a ceramic ball mill until a homogeneous product was formed. The product was then heated in a closed glass container for 2½ hours at 90° C. Upon analysis by the thiosulfate procedure it showed 3.1% available iodine.

*Example VIII*

To 20 grams of the dried polymer of Example II were added 2 parts of elemental iodine and the mixture ball milled in a ceramic ball mill for a period of 18 hours. The product was then heated for 6 hours at 90° C. Chemical analysis of the available iodine showed 6.1%.

*Example IX*

To 100 grams of the insoluble-dried polymer of Example III, 50 parts of iodine were mixed at room temperature in a glass container until a homogeneous product was formed. Thereafter the product was tumbled in a glass lined ball mill for 5 hours. The product was finally heated in a closed glass container for 2½ hours at 80° C. Upon analysis of the thiosulfate procedure it showed 20.3% available iodine.

*Example X*

To 20 grams of the insoluble polymer of Example IV were added 3.4 grams of iodine followed by dry blending in a glass vessel until a homogeneous product was formed. The product was then heated for 10 hours at 50° C. Chemical analysis of the cooled product showed 9.5% available iodine.

*Example XI*

To 50 grams of the insoluble polymer of Example V were added 1 gram of iodine followed by dry blending in a closed vessel in which a homogeneous product was formed. The product was then heated for 12 hours at 50° C. Chemical analysis of the cooled product showed 0.7% available iodine.

All of the insoluble polymeric iodine complexes, as prepared according to Examples VI to XI inclusive are efficient germicides and disinfectants in detergent scouring cleansers of the Ajax type. In preparing such scouring cleaners from 5 to 20 parts of the insoluble polymeric iodine complex containing from 5 to 25% available iodine is simply blended with 80 to 95 parts of the finished detergent scouring cleanser and mixed to uniformity and packaged in the usual manner. They are also useful as dusting powders for humans and animals. Since they are insoluble, they will not swell or become sticky when in contact with perspiration. Accordingly, they behave like an antiseptic talc. These qualities make it ideal for antiseptic skin powders for humans such as foot powders, rubber glove antiseptic for physicians and nurses and for skin treatment of pets and farm animals.

In the germicidal, pesticidal and fungicidal treatment of plants, an essential characteristics of the powdered polymreic complexes is their insolubility since they can be applied as a dust or slurried and sprayed on the plant which leaves an active agent clinging to the leaves, petals, stems, etc. that will not dissolve off. They are also especially adaptable for soil treatment. Because of their insoluble character, the complexes permit antiseptic activity without serious dissolution from their intended area, such as for example deodorants, disinfectants, antiseptics, germicides, bactericides, dentifrices and sanitizers. They are especially adaptable as swimming pool disinfectants in place of chlorine.

The following formulations show how the foregoing insoluble polymeric iodine complexes may be utilized to yield compositoins having excellent scouring and sanitizing properties:

| | Parts by weight |
|---|---|
| Insoluble polymeric iodine complex of Example VI | 20 |
| Sodium tridecylphenyl sulfonate | 3.7 |
| Trisodium phosphate | 3 |
| Finely ground quarts silica, all thru 100 mesh | 73.3 |

| | Parts by weight |
|---|---|
| Insoluble polymeric iodine complex of Example VIII | 10 |
| Trisodium phosphate | 13.7 |
| Sodium dodecylphenyl sulfonate | 2 |
| Finely ground quarts silica, all thru 100 mesh | 74.25 |

The following formulation is ideally adaptable as a floor and wall cleaner:

| | Parts by weight |
|---|---|
| Surface active agent obtained by condensing 1 mole of oleic acid with 1 mole of methyl taurine | 6 |
| Sodium metasilicate 5H$_2$O | 6 |
| Sodium tripolyphosphate | 20 |
| Insoluble polymeric iodine complex of Example IX | 10 |
| Sodium sulfate | 50 |

The following formulation is excellent as a toilet bowl cleanser:

| | Parts by weight |
|---|---|
| Commercial hydrochloric acid | 33 |
| o-Dichlorobenzene | 2.5 |
| Surface active agent obtained by condensed 1 mole of dinonyl phenol with 15 moles of ethylene oxide | 2.6 |
| Insoluble polymeric iodine complex of Example X | 20 |
| Water in sufficient quantity to make 100 parts by weight | |

| | Parts by weight |
|---|---|
| Phosphoric acid (75%) | 10 |
| Insoluble polymeric iodine complex of Example VI | 20 |
| Surface active agent obtained by condensing 1 mole of nonyl phenol with 15 moles of ethylene oxide | 5 |
| Water in sufficient quantity to make 100 parts by weight | |

In addition to the foregoing uses, the insoluble iodine complexes of the present invention show exceedingly antimicrobial effectiveness when dispersed in colloidal form. Such dispersions have phenol coefficients of substantially the same degree as equivalent concentrations of tinctures of iodine. In lieu of this antimicrobial effectiveness and fungicidal activity, they are excellent for the mildewproofing of textile fabrics, paper, fungistatic treatment of cardboard, fiber board, and other cellulosic press boards, preservation of cellulosic felts, antirotting, protection for cordage, rope, fish nets, canvas and the like.

They are particularly adaptable in the germicidal/fungicidal treatment of water. They can be introduced in the existing filters of water purification systems, and unlike soluble germicides, they do not add any foreign taste or capacity for irritating mucous membrane. This applies to drinking water as well as for swimming pools.

We claim:

1. Insoluble polymeric-iodine complexes of polymers obtanied by heating a monomer selected from the class consisting of N-vinyl-2-pyrrolidone, 5-methyl-N-vinyl-2-pyrrolidone, 5 - ethyl - N - vinyl - 2 - pyrrolidone, 3,3,-dimethyl - N - vinyl - 2 - pyrrolidone, 3 - methyl - N-vinyl - 2 - pyrrolidone, 3 - ethyl - N - vinyl - 2 - pyrrolidone, 4 - methyl - N - vinyl - 2 - pyrrolidone, 4 - ethyl N - vinyl - 2 - pyrrolidone, 3 - phenyl - 3 - β - diethylamine - ethyl - N - vinyl - 2 - pyrrolidone, 5 - hydroxymethyl - N - vinyl - 2 - pyrrolidone, N - vinyl - 2 - piperidone, N - vinyl - caprolactam, N - vinyl - 2 - oxazolidone, N-vinyl-5-methyl-2-oxazolidone, N-vinyl-5-ethyl-2-oxazolidone, N-vinyl-3-morpholinone, N-vinyl-2,6-dimethyl-3-morpholinone, and N-vinyl-5-methyl-3-morpholinone at a temperature of 40°–200° C. in the presence of a catalytic amount of an alkaline material selected from the group consisting of alkali metals, alkaline earth metals, and the oxides, hydroxides and alkoxides of these metals, said polymer being characterized by its insolubility in water, strong mineral acids, caustic solutions, and common organic solvents, mixing said polymer with iodine and heating, and the said insoluble polymeric-iodine complexes containing from 0.05 to 25% of available iodine.

2. The insoluble polymeric-iodine complex of the polymer obtained by heating N-vinyl-2-pyrrolidone at a temperature of 40–200° C. in the presence of a catalytic amount of an alkaline material selected from the group consisting of alkali metals, alkaline earth metals, and the oxides, hydroxides and alkoxides of these metals, said polymer being characterized by its insolubility in water, strong mineral acids, caustic solutions, and common organic solvents, mixing said polymer with iodine and heating, and the said insoluble polymeric iodine complex containing from 0.05 to 25% of available iodine.

3. The insoluble polymeric-iodine complex of the polymer obtained by heating N-vinyl-ε-caprolactam at a temperature of 40–200° C. in the presence of a catalytic amount of an alkaline material selected from the group consisting of alkali metals, alkaline earth metals, and the oxides, hydroxides and alkoxides of these metals, said polymer being characterized by its insolubility in water, strong mineral acids, caustic solutions, and common organic solvents, mixing said polymer with iodine and heating, and the said insoluble polymeric-iodine complex containing from 0.05 to 25% of available iodine.

4. The insoluble polymeric-iodine complex of the polymer obtained by heating N-vinyl-2-oxazolidone at a temperature of 40–200° C. in the presence of a catalytic amount of an alkaline material selected from the group consisting of alkali metals, alkaline earth metals, and the oxides, hydroxides and alkoxides of these metals, said polymer being characterized by its insolubility in water, strong mineral acids, caustic solutions, and common organic solvents, mixing said polymer with iodine and heating, and the said insoluble polymeric-iodine complex containing from 0.05 to 25% of available iodine.

5. The insoluble polymeric-iodine complex of the polymer obtained by heating N-vinyl-2-piperidone at a temperature of 40–200° C. in the presence of a catalytic amount of an alkaline material selected from the group consisting of alkali metals, alkaline earth metals, and the oxides, hydroxides and alkoxides of these metals, said polymer being characterized by its insolubility in water, strong mineral acids, caustic solutions, and common organic solvents, mixing said polymer with iodine and heating, and the said insoluble polymeric-iodine complex containing from 0.05 to 25% of available iodine.

6. The insoluble polymeric-iodine complex of the polymer obtained by heating N-vinyl-3-morpholinone at a temperature of 40–200° C. in the presence of a catalytic amount of an alkaline material selected from the group consisting of alkali metals, alkaline earth metals, and the oxides, hydroxides and alkoxides of these metals, said polymer being characterized by its insolubility in water, strong mineral acids, caustic solutions, and common organic solvents, mixing said polymer with iodine and heating, and the said insoluble polymeric-iodine complex containing from 0.05 to 25% of available iodine.

7. The insoluble polymeric-iodine complex of the polymer obtained by heating N-vinyl-5-methyl-2-oxazolidone at a temperature of 40–200° C. in the presence of a catalytic amount of an alkaline material selected from the group consisting of alkali metals, alkaline earth metals, and the oxides, hydroxides and alkoxides of these metals, said polymer being characterized by its insolubility in water, strong mineral acids, caustic solutions, and common organic solvents, mixing said polymer with iodine and heating, and the said insoluble polymeric-iodine complex containing from 0.05 to 25% of available iodine.

8. The insoluble polymeric-iodine complex of the polymer obtained by heating N-vinyl-5-methyl-2-pyrrolidone at a temperature of 40–200° C. in the presence of a catalytic amount of an alkaline material selected from the group consisting of alkali metals, alkaline earth metals, and the oxides, hydroxides and alkoxides of these metals, said polymer being caracterized by its insolubility in water, strong mineral acids, caustic solutions, and common organic solvents, mixing said polymer with iodine and heating, and the said insoluble polymeric-iodine complex containing from 0.05 to 25% of available iodine.

9. The insoluble polymeric-iodine complex of the polymer obtained by heating N-vinyl-5-ethyl-2-oxazolidone at a temperature of 40–200° C. in the presence of a catalytic amount of an alkaline material selected from the group consisting of alkali metals, alkaline earth metals, and the oxides, hydroxides and alkoxides of these metals, said polymer being characterized by its insolubility in water, strong mineral acids, caustic solutions, and common organic solvents, mixing said polymer with iodine and heating, and the said insoluble polymeric-iodine complex containing from 0.05 to 25% of available iodine.

References Cited in the file of this patent

UNITED STATES PATENTS

| 2,650,914 | Graham et al. | Sept. 1, 1953 |
| 2,706,701 | Beller et al. | Apr. 19, 1955 |
| 2,739,922 | Shelanski | Mar. 27, 1956 |
| 2,754,245 | Hosmer | July 10, 1956 |
| 2,900,305 | Siggia | Aug. 18, 1959 |
| 2,938,017 | Grosser | May 4, 1960 |

OTHER REFERENCES

Chemical Abstracts, vol. 49, p. 11961b (1955), abstracting.

Moudgal et al.: "J. Sci. Ind. Res. (India), vol. 14 C, pp. 78–9 (1955).